Patented Jan. 9, 1945

2,366,953

UNITED STATES PATENT OFFICE 2,366,953

MANUFACTURE OF LEAD IODIDE

Harold A. Beatty, Grosse Pointe Farms, Mich., assignor to Ethyl Corporation, New York, N. Y., a corporation of Delaware No Drawing. Application April 25, 1944,
Serial No. 532,648

2 Claims. (Cl. 23—97)

This invention relates to the manufacture of lead iodide. A direct reaction between elemental lead and iodine is known. The reaction is so highly exothermic that it is difficult to control even with a gradual addition of iodine. Hence, the manufacture of lead iodide has been commonly carried out by the reaction of two salts such as potassium or sodium iodide and lead nitrate or acetate. This is more costly than the direct union of the two elements because the principal cost of manufacture is the cost of iodine or the iodine salts, and the iodine salts are more costly than elemental iodine. There is usually an additional cost in the manufacture with salts in that the precipitated lead iodide has to be washed, dried, and often purified by recrystallization.

I have produced pure lead iodide from a direct reaction between lead and iodine by mixing iodine vapor with an inert gas, such as nitrogen or helium, and passing the mixture through molten lead. The gas agitates the molten lead and promotes the reaction; it also provides a means of controlling the rate of the reaction. The rate of reaction can be decreased by increasing the dilution. The iodine vapor under these conditions reacts readily and completely so that recirculation of the inert gas is not required. When the temperature of the reactor is maintained above the melting point of lead iodide, the pure lead iodide forms in a liquid layer on top of the molten lead. If the temperature of the molten lead is kept below the melting point of lead iodide, the reaction takes place, but the lead iodide tends to disperse throughout the molten lead, increasing the problem of separating and removing the lead iodide.

This method of forming lead iodide can be carried out by batch or continuous process operations. In the continuous operation, the molten lead in the reaction vessel and the iodine in the vaporizer are replenished during the reaction and the lead iodide floating on the surface of the lead is drawn off. Since the principal cost is the price of iodine, the preferred method depends upon conditions surrounding the reaction, such as the amount and rate of production desired.

Good results have been obtained with nitrogen gas, containing by volume approximately fifty percent of iodine vapor, forced upwardly through four inches of molten lead. In this specific reaction the temperature of the iodine vaporizer was 325° F., and the temperature of the molten lead was 835°–885° F. which is above the melting point of lead iodide. However, none of these numerical values is crtical and each of them may be varied to control the rate of reaction and to maintain the amount of unreacted iodine vapor at a negligible value or nil. In the above specific reaction, the nitrogen introduced amounted to 2.7 cubic feet per minute and it was saturated with iodine vapor at the gas temperature (325° F.) used. The rate of production of lead iodide was 165 pounds per hour.

I claim:

1. The process of manufacturing lead iodide which comprises diluting iodine vapor with an inert gas and passing the diluted vapor through molten lead.

2. The process of manufacturing lead iodide which comprises diluting iodine vapor with an inert gas and passing the diluted vapor through molten lead having a temperature above the melting point of lead iodide.

HAROLD A. BEATTY.